(12) United States Patent
Blanche et al.

(10) Patent No.: US 11,780,379 B2
(45) Date of Patent: Oct. 10, 2023

(54) ADD-ON PART HAVING AN INTEGRATED CAMERA MODULE

(71) Applicant: SAINT-GOBAIN GLASS FRANCE, Courbevoie (FR)

(72) Inventors: Luc-Henry Blanche, Hagen (DE); Laurent Friocourt, Stuttgart (DE); Marcus Guldan, Uhingen (DE); Clément Mosnier, Winnenden (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 835 days.

(21) Appl. No.: 16/758,656

(22) PCT Filed: Oct. 18, 2018

(86) PCT No.: PCT/EP2018/078480
§ 371 (c)(1),
(2) Date: Sep. 29, 2020

(87) PCT Pub. No.: WO2019/081315
PCT Pub. Date: May 2, 2019

(65) Prior Publication Data
US 2022/0250555 A1 Aug. 11, 2022

(30) Foreign Application Priority Data
Oct. 26, 2017 (EP) .................................... 17198521

(51) Int. Cl.
| | | |
|---|---|---|
| *B60R 11/00* | (2006.01) | |
| *B60R 11/04* | (2006.01) | |
| *H04N 23/57* | (2023.01) | |
| *B29C 45/16* | (2006.01) | |
| *B29L 31/34* | (2006.01) | |
| *H04N 23/55* | (2023.01) | |

(52) U.S. Cl.
CPC ............ *B60R 11/04* (2013.01); *H04N 23/57* (2023.01); *B29C 45/16* (2013.01); *B29L 2031/3481* (2013.01); *H04N 23/55* (2023.01)

(58) Field of Classification Search
CPC ............ B60R 11/04; B60R 1011/0019; B60R 2011/0026; H04N 23/57; H04N 23/55
(Continued)

(56) References Cited

U.S. PATENT DOCUMENTS 7,322,755 B2 * 1/2008 Neumann ............. B60S 1/0844
348/148
10,955,680 B2 * 3/2021 Kato .................... C08G 63/199
(Continued)

FOREIGN PATENT DOCUMENTS

| CN | 1946592 A | 4/2007 |
|---|---|---|
| CN | 103827707 A | 5/2014 |

(Continued)

OTHER PUBLICATIONS

Examination Report as issued in Indian Patent Application No. 202017014172, dated Dec. 30, 2020.
(Continued)

*Primary Examiner* — Dennis H Pedder
(74) *Attorney, Agent, or Firm* — Pillsbury Winthrop Shaw Pittman LLP (57) ABSTRACT

A vehicle add-on part for integrating a camera module includes a cover, which consists at least partially of a transparent thermoplastic material, a carrier part for a camera module, and a camera module having at least one camera lens. The transparent thermoplastic material of the cover has, on the inner side, a local thickening and/or a local thinning, and the camera module is held in the carrier part such that the at least one camera lens of the camera module is arranged directly opposite the thickening and/or the thinning.

19 Claims, 8 Drawing Sheets

(58) Field of Classification Search
 USPC .......................................................... 296/1.07
 See application file for complete search history.

(56) References Cited

U.S. PATENT DOCUMENTS

2008/0112050 A1    5/2008   Nomura
2016/0209647 A1*   7/2016   Fürsich .............. G02B 27/0075
2016/0264064 A1    9/2016   Byrne et al.

FOREIGN PATENT DOCUMENTS

| CN | 104570266 A | 4/2015 |
|----|-------------|--------|
| CN | 204821378 U | 12/2015 |
| CN | 105283355 A | 1/2016 |
| DE | 10 2004 024735 A1 | 12/2005 |
| DE | 10 2004 057322 A1 | 6/2006 |
| DE | 10 2006 059555 A1 | 6/2008 |
| JP | 2008-500926 A | 1/2008 |
| JP | 2016-107755 A | 6/2016 |

OTHER PUBLICATIONS

Notice of Reasons for Rejection as issued in Japanese Patent Application No. 2020-523290, dated Jun. 8, 2021.
Notice of Preliminary Rejection as issued in Korean Patent Application No. 10-2020-7014459, dated May 25, 2022.
Search Report as issued in Chinese Patent Application No. 201880003338.9, dated Oct. 12, 2022.

* cited by examiner

```
┌─────────────────────────────────────────────────────┐
│ Injection molding a cover 1 made of a transparent   │
│              thermoplastic material 1.1             │
└─────────────────────────────────────────────────────┘
                          ↓
┌─────────────────────────────────────────────────────┐
│  Injection molding a carrier part 12 onto the cover 1│
└─────────────────────────────────────────────────────┘
                          ↓
┌─────────────────────────────────────────────────────┐
│           Assembly of the camera module 3           │
└─────────────────────────────────────────────────────┘
```

ADD-ON PART HAVING AN INTEGRATED CAMERA MODULE

CROSS-REFERENCE TO RELATED APPLICATIONS

This application is the U.S. National Stage of PCT/EP2018/078480, filed Oct. 18, 2018, which in turn claims priority to European patent application number 17 198 521.1 filed Oct. 26, 2017. The content of these applications are incorporated herein by reference in their entireties.

The invention relates to an add-on part for a vehicle, hereinafter also referred to as "vehicle add-on part" or, in short, "add-on part", in which a camera module is integrated, its manufacture and use.

Modern vehicle concepts often have high performance driver assistance systems and in particular systems for autonomous driving. For this, complex sensor technology is required to detect and evaluate the very extensive environmental data. In addition to radio and radar systems, optical systems are also used here.

For design-technology reasons, it is desirable for the vehicle manufacturer to install this sensor technology in or on the vehicle as invisibly as possible for the outside viewer. In the case of camera systems that also require a view of the environment in the visual spectrum of light from 380 nm to 780 nm, these are usually cleverly mounted behind mineral glass and thus concealed or obscured for the viewer under normal lighting conditions.

Figure 1:
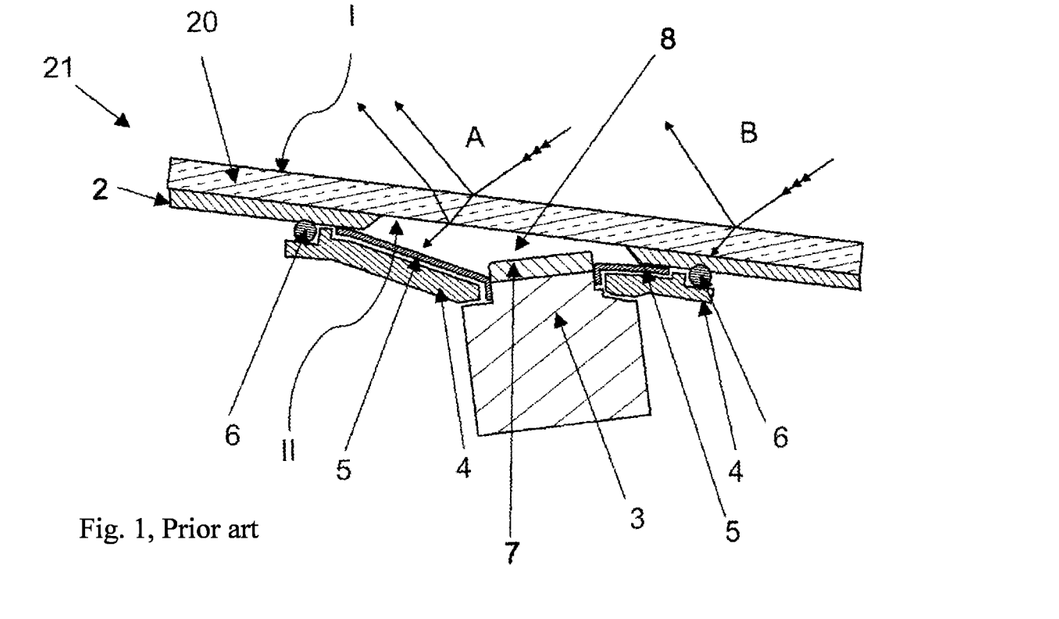
FIG. 1 a cross-section of a vehicle add-on part having an integrated camera module according to the prior art, FIG. 2 a cross-section of an embodiment of the add-on part according to the invention, FIG. 3 a cross-section of an embodiment of the add-on part according to the invention, FIG. 4 a cross-section of an embodiment of the add-on part according to the invention, FIG. 5 a cross-section of an embodiment of the add-on part according to the invention, FIG. 6 a cross-section of an embodiment of the add-on part according to the invention, FIG. 7 a cross-section of an embodiment of the add-on part according to the invention, FIG. 8 a cross-section of an embodiment of the add-on part according to the invention, wherein the nozzle for injection of the cover is depicted schematically, FIG. 9 a cross-section of an embodiment of the add-on part according to the invention, FIG. 10 a cross-section of an embodiment of the add-on part according to the invention, FIG. 11 a cross-section of an embodiment of the add-on part according to the invention, FIG. 12 a flow chart of a method for producing an add-on part according to the invention, FIG. 13 a flow chart of an alternative method for producing an add-on part according to the invention, FIG. 14 a flow chart of an alternative method for producing an add-on part according to the invention, and FIG. 15 a cross-section of an embodiment of the add-on part according to the invention.

However, depending on the strength and the angle of the light striking the surface of the component and the viewing angle, there are certain limits to such a concept. Under certain conditions, the assemblies integrated behind a transparent cover can become visible. Consequently, it is important to design them as small and thus as inconspicuous as possible. In the case of a camera module, these are the camera lens and, possibly, the fastening elements and cables. Also important, however, is the conical aperture angle required for the camera's view. Both the light reflection at the outer skin of the cover and the reflection at the inner skin of the cover or at the interface between the cover and the carrier part are decisive for the visibility of the camera module from the outside (FIG. 1).

In the prior art, in order to design the camera element as invisible as possible in the case of add-on parts, the immediate region around the lens is flocked black. The flocking absorbs the light that has penetrated through the transparent cover (i.e., the light not reflected), which then cannot emerge again. For the viewer, the camera region stands out from the black back-injected region due to the partially reflected light at the interface between the inner skin and the air.

The viewing direction of the camera lens in the add-on part is often not aimed perpendicular to the outer skin of the add-on part, i.e., of the outer side of the cover, but, instead, is preferably directed slightly downward and/or slightly to the side in order, for example, to image parts of the road. With prior art add-on parts, this requires larger installation space and thus increases the risk of increased water or water vapor entry. The more air situated in the space between the lens and the cover, the more the optical properties of the camera system can be adversely affected, since possible water vapor can condense.

To avoid the adverse effects, in the prior art, microporous membranes, in particular membranes made of expanded polytetrafluoroethylene (ePTFE) are integrated into the vehicle add-on part with an integrated camera module in order to keep liquid water away from the intermediate space and, at the same time, to enable evaporation of water vapor from the interior. However, this increases production costs and, with integration of the membranes, entails a further manufacturing step.

Alternatively, according to the prior art, as described in DE 10 2004 057 322 A1, anti-fogging layers are applied to the surface of the pane facing the camera.

US 2008/0112050 A1 describes providing the surface of a lens part with a hydrophobic layer and providing the surface of a part surrounding the lens with a hydrophilic layer.

WO 2013/13700 A1 discloses arranging a heating device in the vehicle part to prevent water vapor condensation.

DE 10 2006 059 555 A1 discloses a camera arrangement with a camera looking through a pane, wherein a space between the camera and the pane is filled with a condensed medium.

DE 10 2004 024 735 A1 shows a camera arrangement in which a light guide made of a solid, optically transparent material is arranged between a camera lens and a vehicle pane.

The object of the invention consists in providing a vehicle add-on part in which a camera module is integrated, which is lightweight, can be produced in few steps, in which the risk of fogging from water vapor is minimized, and/or in which the integrated camera module is as invisible as possible from the outside.

The object of the present invention is accomplished according to the invention by a vehicle add-on part having an integrated camera module, a method for its production and its use according to the independent claims. Preferred embodiments are apparent from the dependent claims.

The add-on part according to the invention comprises at least a cover with an outer side and an inner side and a carrier part that is arranged on the inner side of the cover and in which a camera module is arranged. The camera module includes at least one camera lens. The module can include a single camera lens or two or more camera lenses, preferably arranged next to one another. The at least one camera lens is arranged in the direction of the inner side of the cover such that the beam path to the camera lens passes through the cover from the outside.

The surface of the cover that, in the installed position, faces the external environment of the vehicle is referred to as the "outer side". The surface of the cover that, in the installed position, faces the interior of the vehicle is referred to as the "inner side".

The camera lens can have any suitable diameter. The diameter of the camera lens is preferably between 1 mm and 100 mm, particularly preferably between 1 mm and 50 mm, most particularly preferably between 5 mm and 30 mm, for example, 11 mm.

According to the invention, the cover is made at least partially of a transparent thermoplastic material. In addition to the transparent thermoplastic material, it can, for example, contain a film, a non-transparent plastic, and/or metal parts. In a preferred embodiment, the cover is made entirely of a transparent thermoplastic material.

According to the invention, the transparent thermoplastic material of the cover has, on the inner side of the cover, a local thickening and/or thinning, i.e., the transparent thermoplastic material is thickened in a certain region and/or thinned in a certain region. The thickening and/or the thinning is arranged directly opposite the camera lens in the vehicle add-on part according to the invention. In other words, the point of the maximum thickness of the thickening and/or the point of the minimum thickness of the thinning is arranged directly opposite the camera lens. These points need not be arranged directly opposite the center of the camera lens; they can, for example, also be arranged directly opposite an edge or an edge region of the camera lens. The entire region of the cover that is thickened and/or thinned preferably equals at least the dimensions of the camera lens, particularly preferably the dimensions of the cone angle required for the camera module. Preferably, the transparent thermoplastic material of the cover reaches all the way to the camera lens in the region of the local thickening and/or thinning such that the inner side of the cover is connected almost flush with the camera lens. In the case of the add-on part according to the invention, the region between the outer side of the cover and the camera lens is thus almost completely filled with the thermoplastic material of the cover.

In one embodiment, the vehicle add-on part having an integrated camera module comprises a cover with an outer side and an inner side, wherein the cover is made, at least in sections, of a transparent thermoplastic material, and a carrier part that is arranged on the inner side of the cover and in which a camera module is arranged, wherein the cover on the inner side has a local thickening of the transparent thermoplastic material, and wherein the camera module includes at least one camera lens and is arranged in the carrier part such that the at least one camera lens is arranged directly opposite the local thickening. Preferably, the local thickening of the plastic of the cover reaches all the way to the camera lens such that the inner side of the cover is connected almost flush with the camera lens. The region between the outer side of the cover and the camera lens is thus almost completely filled with the thermoplastic material of the cover.

In another embodiment, the vehicle add-on part having an integrated camera module comprises a cover with an outer side and an inner side, wherein the cover is made, at least in sections, of a transparent thermoplastic material, and a carrier part that is arranged on the inner side of the cover and in which a camera module is arranged, wherein the cover has, on the inner side, a local thickening and a local thinning of the transparent thermoplastic material, and wherein the camera module includes at least one camera lens and is arranged in the carrier part such that the at least one camera lens is directly opposite the local thickening and the local thinning. Preferably, the transparent thermoplastic material of the cover reaches, in the region of the local thickening and the local thinning, all the way to the camera lens such that the inner side of the cover is connected almost flush with the camera lens. With the add-on part according to the invention, the region between the outer side of the cover and the camera lens is thus almost completely filled with the thermoplastic material of the cover.

In another embodiment, the vehicle add-on part having an integrated camera module comprises a cover with an outer side and an inner side, wherein the cover is made, at least in sections, of a transparent thermoplastic material, and a carrier part that is arranged on the inner side of the cover and in which a camera module is arranged, wherein the cover has, on the inner side, a local thinning of the transparent thermoplastic material, and wherein the camera module includes at least one camera lens and is arranged in the carrier part such that the at least one camera lens is arranged directly opposite the local thinning. Preferably, the camera module is arranged such that the transparent thermoplastic material of the cover reaches, in the region of the local thinning, all the way to the camera lens such that the inner side of the cover is connected almost flush with the camera lens. With the add-on part according to the invention, the region between the outer side of the cover and the camera lens is thus almost completely filled with the thermoplastic material of cover.

The outer side of the cover preferably has substantially the form of a planar surface, a slightly curved surface, or a curved surface.

The outer side of the cover constitutes, in the installed position, the outer skin visible for a viewer. The add-on part according to the invention is thus not an additional component for attachment to the inner side of a vehicle window pane, as is the case with the component described in DE 10 2004 024 735 A1.

In one embodiment, the camera lens is bonded in a materially integral manner to the inner side of the cover in the region of the local thickening and/or local thinning of the transparent thermoplastic material of the cover. In this case, the region between the outer side of the cover and the camera lens is completely filled with the thermoplastic material of the cover. A materially integral bond between the inner side of the cover and the camera lens can also be achieved by the additional introduction of a transparent filling compound. The filling compound preferably has a refractive index similar to the cover and the camera lens or a refractive index that is between the refractive index of the cover and the refractive index of the camera lens.

Here, and in the following, the term "thickening" means an increase in the wall thickness of the thermoplastic material of the cover. According to the invention, this thickening is implemented only on the inner side of the cover, i.e., according to the invention, this increase in the wall thickness is implemented only in the direction of the camera lens.

Here, and in the following, the term "thinning" means a decrease in the wall thickness of the thermoplastic material of the cover. According to the invention, this thinning is implemented only on the inner side of the cover.

The feature "transparent" refers, in the context of the invention, to transparency in the wavelength range relevant for the radiation receiver. For radiation receivers, i.e., cameras, in the visible range and/or in the infrared range, the transmittance for wavelengths from 200 nm to 2000 nm is preferably more than 60%, particularly preferably >70%, and in particular >90%.

The radiation receiver preferably includes cameras for visible light of wavelengths from 380 nm to 780 nm and/or infrared light of wavelengths from 780 nm to 1300 nm.

In a preferred embodiment, the wavelength range detected by the camera substantially corresponds to the wavelength range visible to the human eye, i.e., 380 nm to 780 nm.

The add-on part according to the invention enables, for example, not only the integration of a driver assistance camera or an accident recording camera in the visible range, but also the integration of an infrared night vision camera, designed, for example, for lane detection and/or object detection.

The local thickening and/or the local thinning can have any three-dimensional shape that meets the technical requirements. In particular, the local thickening and/or the local thinning can have a shape that optimizes the beam path and/or that produces optical effects.

The shaping of the local thickening and/or the local thinning is governed in particular by the size and number of the camera lenses, their viewing direction, and the (conical) aperture angle necessary for the camera's view.

The thickening and/or thinning can have, for example, the shape of a cuboid, a cone, a wedge, a cylinder, or a trapezoidal prism.

For example, the cross-section of the thickening and/or the thinning can have a quadrangular, preferably rectangular or trapezoidal shape. This can, in particular, be the case when one or more camera lenses arranged next to one another in one plane and at one height in the camera module are arranged such that the viewing direction of the camera lenses is, in each case, perpendicular to the outer side of the cover.

The cross-section of the thickening and/or the thinning can, for example, also have a substantially triangular shape. This can, in particular, be the case when one or more camera lenses arranged next to one another in the camera module are arranged such that the angle between the viewing direction of the camera lens and the outer side of the cover is less than 90°, preferably between 85° and 30°, particularly preferably between 85° and 50°, most particularly preferably between 85° and 65°. This can, for example, also be the case when one or more camera lenses arranged next to one another in one plane such that the angle between the viewing direction of the camera lens and the outer side of the cover is less than 90°, preferably between 89° and 30°, particularly preferably between 89° and 65°, most particularly preferably between 89° and 85°.

In the case of a camera module with multiple camera lenses not arranged on one plane and/or multiple camera lenses whose viewing directions differ, the thickening and/or the thinning of the transparent thermoplastic material is preferably implemented such that the transparent thermoplastic material terminates substantially flush with the camera lenses.

In the region outside the thickening and/or thinning, the transparent thermoplastic material of the cover is preferably 1 mm to 5 mm thick, particularly preferably 2 mm to 3 mm thick. In the region of the thickening, the transparent thermoplastic material of the cover is preferably preferably is thicker by a maximum of 1 mm to 20 mm than in the region outside the thickening. In the region of the thinning, the transparent thermoplastic material of the cover is preferably thinned at most to 1 mm.

In one embodiment of the add-on part according to the invention, the cover has, on the inner side, a thickening, wherein the transparent thermoplastic material of the cover is thicker in a region of thickening by a maximum of 1 mm to 20 mm than in a region outside the thickening, and preferably the transparent thermoplastic material of the cover in the region outside the thickening is 1 mm to 5 mm thick, particularly preferably 2 mm to 3 mm thick.

As a result of the thickening of the transparent thermoplastic material of the cover in the direction of the camera lens and/or the thinning of the transparent thermoplastic material of the cover and the arrangement of the camera module such that the camera lens is directly opposite the region of the thickening and/or thinning, the cavity formed between the camera lens and the inner side of the cover is reduced and thus the risk of fogging by water vapor is likewise reduced, preferably minimized. With the add-on part according to the invention, the integration of microporous membranes, in particular membranes made of expanded polytetrafluoroethylene (ePTFE), into the camera module, to keep liquid water away from the intermediate space between the camera lens and the cover and, at the same time, to enable evaporation of water vapor from the interior, can, consequently be dispensed with. This applies in particular for the case when the thickening and/or the thinning terminates substantially flush with the camera lens, i.e., when almost the entire region between the outer side of the cover and the camera lens is filled with the thermoplastic material of the cover. The possibility of dispensing with the microporous membranes results, among other things in that the add-on part according to the invention consists of fewer individual components than prior art add-on parts, making possible a reduction of production costs and simplifying assembly.

With the vehicle add-on part according to the invention, the transparent thermoplastic material of the cover represents, in particular, not only the outer skin of the add-on part visible to the viewer, but serves, at the same time, as a light guide for the camera attached on the inner side of the add-on part. With the add-on part according to the invention, due to the local thickening and/or local thinning and the arrangement of the camera module such that the camera lens is arranged directly opposite the local thickening and/or local thinning, the light guide reaches closer to the camera lens than with prior art add-on parts, and preferably terminates substantially flush with the camera lens or is preferably bonded to the camera lens in a materially integral manner. This advantageously affects your sleep the optical properties of the camera system.

Another advantage of the add-on part according to the invention is that the weight of the cover is significantly reduced compared to a cover made of mineral glass. This due to the fact that the cover is at least partially made of a transparent thermoplastic material.

In an embodiment, the viewing direction of the camera lens is not aimed perpendicular to the outer skin of the add-on part, but, instead, slightly downward and/or slightly to the side, for example, to image parts of the road. In this embodiment, the angle between the viewing direction of the camera lens and the outer side of the cover is less than 90°, preferably between 85° and 30°, particularly preferably between 85° and 50°, most particularly preferably between 85° and 65°. In another embodiment, the angle between the viewing direction of the camera lens and the outer side of the cover is less than 90°, preferably between 89° and 30°, particularly preferably between 89° and 65°, most particularly preferably between 89° and 85°. A corresponding local thickening and/or local thinning of the transparent thermoplastic material of the cover in the region that is directly opposite the camera lens, ensures, even in these embodiments, a reduction of the intermediate space between the inner side of the cover and of the camera lens and thus, in particular, a substantially flush or a materially integral connection of the camera to the cover.

Surface structures that can optimize the optical properties of the camera lens or the incident, such as curvatures, prisms, or Fresnel optics, can be introduced into the transparent thermoplastic material of the cover on the inner side. In addition to a weight reduction, this represents a further advantage compared to the use of mineral glass since the introduction of subsurface structures is not possible in mineral glass.

The transparent thermoplastic material of the cover preferably contains at least polyethylene (PE), polycarbonates (PC), polypropylene (PP), polystyrene, polybutadiene, polynitriles, polyesters, in particular polyethylene terephthalate (PET), polyurethanes (PU), polymethyl methacrylates (PMMA), polyacrylates, polyamides (PA), acrylonitrile butadiene styrene copolymers (ABS), styrene acrylonitrile copolymers (SAN), acrylonitrile styrene acrylester copolymers (ASA), acrylonitrile butadiene styrene-polycarbonate mixtures (ABS/PC), and/or their copolymers, co-condensates, and/or mixtures.

Particularly preferably, the transparent thermoplastic material of the cover contains polycarbonates (PC), polymethyl methacrylate (PMMA), styrene acrylonitrile (SAN), and/or copolymers or mixtures thereof. These polymers allow processing to high-gloss surfaces, some of which are glass-like depending on the intended application.

The add-on part, in particular the cover, is preferably provided with a protective coating (hardcoat), particularly preferably with thermally or UV curing lacquers, particularly preferably polysiloxanes, polyacrylates, polymethyl acrylates, polyurethanes, and/or mixtures or copolymers thereof. The hardcoat improves the resistance to mechanical damage, weathering, temperature fluctuations, UV radiation, and/or aggressive chemicals from the air or from spray water. Optionally, the hardcoat can also assume decorative functions.

The protective coating preferably has a thickness of 1 μm (micron) to 50 μm, particularly preferably of 2 μm to 25 μm.

Any carrier part suitable for the integration of a camera module is suitable as a carrier part. The carrier part is implemented such that the camera module can be held such that the camera lens is arranged directly opposite the region of the thickening and/or the thinning of the cover.

The carrier part can, for example, be implemented like the carrier part known from the prior art including a camera carrier and ring seals (cf. FIG. 1).

In a preferred embodiment, the carrier part is made of thermoplastic material. It preferably contains or consists of polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate (PET), preferably acrylonitrile butadiene styrene (ABS), acrylonitrile styrene acrylester (ASA), acrylonitrile butadiene styrene-polycarbonate (ABS/PC), and/or copolymers or mixtures thereof.

Preferably, the carrier part made of thermoplastic material contains inorganic or organic fillers, particularly preferably $SiO_2$, $Al_2O_3$, $TiO_2$, clay minerals, silicates, zeolites, glass fibers, carbon fibers, glass spheres, organic fibers, and/or mixtures thereof. These fillers can increase the stability of the carrier part. In addition, the fillers can reduce the polymeric material content and thus lower the manufacturing costs of the component.

The thermoplastic material from which the carrier part for the camera module is made in one embodiment is preferably opaque, particularly preferably colored, in particular of a dark color, most particularly preferably black.

In one embodiment, the thermoplastic material from which the carrier part is made is transparent.

The carrier part made of thermoplastic material is preferably is preferably 1 mm to 100 mm thick, particularly preferably 2 mm to 50 mm, most particularly preferably 2 mm to 10 mm, in particular 2 mm to 3 mm thick.

The embodiment, in which the carrier part is manufactured from thermoplastic material as an injection molded part, offers the advantage of simplified assembly of the camera module in the carrier part, since, in this case, the recess for the camera module, fastening elements such as domes, clip openings, or the like, and recesses for cables connected to the camera module can be introduced directly into the carrier part implemented as an injection molded part. Preferably, the camera module has a counterpart mounting concept such that, for example, the camera module can be clipped onto the carrier part in only one step and and gluing of the fastening elements is unnecessary. In contrast, in the case of a cover made of mineral glass, the inner shell and the fastening elements often have to be glued additionally.

In one embodiment, the cover is implemented as an injection molded part made of transparent thermoplastic material. This cover can then be connected to an above-described carrier part for the integration of the camera module.

In a preferred embodiment, the cover and the carrier part are implemented as a 2-component injection molded part.

In an alternative embodiment, the cover is implemented as a 1-component injection molded part with a back-injected polymeric film. The back-injected film is preferably opaque, particularly preferably colored, in particular dark-colored, most particularly preferably, it is black. A carrier part for the integration of the camera module can then be attached to the film, i.e., the carrier part is joined to the film.

The polymeric film preferably contains polycarbonates (PC), polymethyl methacrylate (PMMA) polyethylene terephthalate (PET), polybutylene terephthalate (PBT), polycarbonate-polybutylene terephthalate (PBT/PC), styrene acrylonitrile (SAN), and/or copolymers or mixtures thereof.

In one embodiment, the film is colored and/or implemented with one or more patterns such that it can produce an optical effect. There is, for example, the possibility of introducing decorative elements into the add-on part via such a film.

The add-on part according to the invention can preferably be a front window pane, a rear window pane, a side window pane, or a roof panel, a trim strip, in particular a side trim strip, a front trim strip, a rear trim strip, or a decorative trim strip, a bumper, a sill, a spoiler, a lamp cover, or a panel, in particular a column panel, particularly preferably a B-column panel.

The invention further includes a method for producing an add-on part according to the invention having an integrated camera module.

The method includes, as steps, at least providing a cover that is made at least partially from a transparent thermoplastic material and that has, on its inner side, a local thickening and/or a local thinning of the transparent thermoplastic material, providing a carrier part for a camera module that includes at least one camera lens, joining the cover to the carrier part and holding the camera module in the carrier part, wherein the camera module is held in the carrier part such that the camera lens of the camera module is arranged directly opposite the local thickening and/or the local thinning of the transparent thermoplastic material of the cover.

Optionally, the method can include, as a further step, applying a protective coating preferably by means of flood coating. The protective coating can be applied on the the cover and/or the carrier part. Alternatively, the protective coating can also be applied to the add-on part with or without a camera module.

In an embodiment of the method according to the invention, the transparent thermoplastic material of the cover made at least partially of transparent thermoplastic material reaches all the way to the camera lens in the region of the local thickening and/or local thinning and preferably terminates substantially flush therewith.

In an embodiment of the method according to the invention, the cover and carrier part connected thereto are produced as a 2-component injection molded part in the 2-component injection molding process or in the 2-component injection-compression molding process with turning platen technology. These processes enable virtually waste-free production because subsequent trimming of the workpiece is unnecessary. Complex structures can also be produced directly.

Either the cover can be produced first as an injection molded part and then the carrier part injected onto it; or, alternatively, the carrier part can be produced first and the cover then injected onto it.

Optionally, the method includes "optical bonding" as a further step to achieve a materially integral bond between the inner side of the cover and the camera lens. In this step, a transparent filler compound preferably having a refractive index similar to that of the cover and the camera lens or a refractive index between them, is inserted between the camera lens and the cover.

In an alternative method, the cover, which has a local thickening and/or a local thinning, can be produced as a 1-component injection-molded part with a back-injected film. In this method, a film or a film blank is first inserted into the side of the cover injection molding cavity that later constitutes the inner side of the cover, wherein the film is preferably opaque, particularly preferably colored, in particular dark-colored, most particularly preferably is black. The film or the film blank preferably has a local opening in the region where the camera lens is later situated. The film blank is then back-injected with the transparent material, i.e., the injection molding cavity is filled while the film remains in place. The film blank can be preshaped according to the tool contour to ensure a better fit and, optionally, better shaping at the time of the back injection. A carrier part for integrating a camera module can be attached to this cover, more precisely, to the film blank, with the camera module arranged in the carrier part such that the camera lens is arranged directly opposite the local thickening and/or the local thinning.

In one embodiment, the film is colored and/or implemented with one or more patterns such that it can produce an optical effect. For example, decorative elements can be introduced into the add-on part via such a film.

During the production of the cover as an injection molded part or as an injection molded part with a back-injected film, the injection molding compound can, for example, be introduced via a lateral fan sprue and/or lateral injection points and/or via an injection point in the region of the local thickening and/or the local thinning.

In a preferred embodiment, the injection molding compound can be introduced during production of the cover as an injection molded part or as an injection molded part with a back-injected film via an injection point in the region of the local thickening and/or the local thinning and, optionally, additionally via a lateral fan sprue and/or lateral injection points. As a result of this type of introduction, an appropriate holding pressure can be applied in the region of the local thickening and/or the local thinning after the de-molding of the injection molding compound; and, thus, a collapse of the transparent injection molding compound during cooling of the transparent injection molding compound in the injection mold can be prevented or minimized. In this manner, deterioration of the reflection optics on the outer side of the panel due to sink marks can be avoided. The holding pressure depends on the previously required filling pressure and can, for example, be in the range from 300 to 500 bar. The injection point in the region of the local thickening and/or local thinning is preferably not positioned in the region that is located directly opposite the camera lens after integration of the camera module so the optics of the camera module are not affected by the injection point. The diameter of the nozzle with which the injection molding compound can be introduced in the region of the local thickening and/or local thinning is between 1 mm and 10 mm, preferably between 2 mm and 5 mm.

The invention further includes the use of the add-on part for integrating a camera module in vehicles, preferably motor vehicles, trucks, buses, in particular for integrating a camera module in a window pane, in particular a front window pane, a rear window pane, a side window pane, or a roof panel, in a trim strip, in particular a side trim strip, a front trim strip, a rear trim strip, or a decorative trim strip, in a bumper, in a sill, in a spoiler, in a lamp cover, or in a panel, in particular a column panel, particularly preferably in a B-column panel.

In the following, the invention is explained in detail with reference to drawings. The drawings are purely schematic representations and are true neither to angle, size, nor scale. They in no way restrict the invention.

They depict.

FIG. 1 depicts a cross-section of a prior art vehicle add-on part (21) having an integrated camera module (3). The prior art vehicle add-on part (21) includes a cover (20) made of glass, which is joined to a black inner shell (2). A camera carrier (4) with the ring seal is attached to this inner shell (2). A camera module (3) that includes a camera lens (7) is held in the camera carrier (4). The camera lens (7) points in the direction of the inner side (II) of the cover (20).

FIG. 1 depicts the light reflection at the outer skin (I) of the cover (20) and the reflection at the inner skin (II) of the cover (20) or the interface between the cover (20) and the camera carrier (4).

When light strikes the outer skin (I) of the cover (20) from any angle, a considerable portion of the light is initially reflected; however, a portion of the light is refracted and deflected at the surface and enters the optically denser medium glass. Depending on the region of the add-on part (21) where this occurs, two different effects occur: in the region of the camera recess, the inner skin (II) of the cover (20) usually has contact with air, the optically thinner medium compared to glass, and thus a partial reflection occurs at this interface. A considerable portion of the light is reflected again and reaches the eye of the viewer after partial reflection again at the outer skin (I) (beam path A). In the region outside the camera region, however, the cover (20) is fixedly joined to the black inner shell (2) via the inner skin (II). Here, little or no reflection occurs since the light is largely absorbed by the black carrier material (beam path B).

In order to design the camera module (3) with prior art add-on parts (21) as invisible as possible, the portion of the camera carrier (4) facing the inner side (II) of the cover (20) is flocked in black. This flocking (5) absorbs the light that has penetrated through the transparent cover (20) (non-reflected light), which then cannot escape again. Due to the partially reflected light at the interface between the inner skin (II) and air, the camera region stands out for the viewer more or less clearly from the black background region with the inner shell (2). The material of the cover (20) does not reach all the way to the camera lens (7); there is a cavity with air (8) between the inner side (II) of the cover (20) and the camera lens (7), into which water can penetrate and condense, as a result of which the optical properties of the camera module (3) can be adversely affected.

Figure 2:
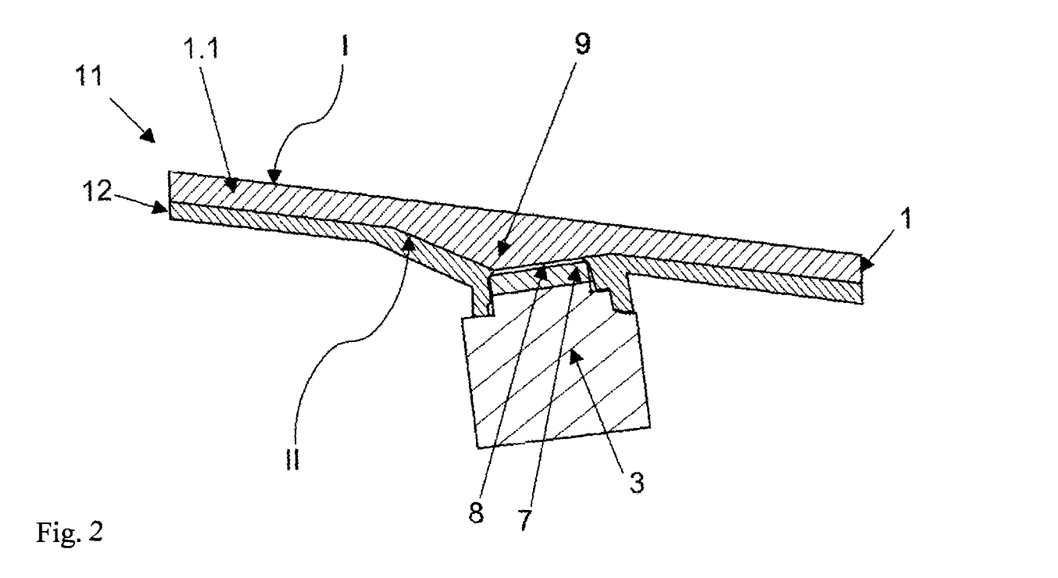

FIG. 2 depicts a cross-section of an embodiment of the add-on part (11) according to the invention, comprising a cover (1) made of a transparent thermoplastic material (1.1), a carrier part (12) connected thereto made of a thermoplastic material, and a camera module (3) held in the carrier part (12) and having a lens (7) that is arranged in the direction of the inner side (II) of the cover (1). The diameter of the camera lens (7) is, for example, 11 mm. In the embodiment depicted, the angle between the viewing direction of the camera lens (7) and the outer side (I) of the cover (1) is different from 90°, for example, 65°. The angle can, however, also have a different value, for example, be 85°. The cover (1) has, on its inner side (II) in the direction of the camera lens (7), a local thickening (9) of the transparent thermoplastic material (1.1) and thus reaches all the way to the camera lens (7). The camera lens (7) is arranged directly opposite the local thickening (9). As a result, the cover (1) is connected to the camera lens (7) substantially flush and the cavity with air (8) formed between the camera lens (7) and the inner side (II) of the cover (1) is minimized. In this way, the fogging of the lens (7) or the inner side (II) of the cover (1) due to condensation of water vapor can be minimized. The thermoplastic material (1.1) is, in the region outside the thickening (9), for example, 3 mm thick and, in the region of the thickening (9), is thicker by a maximum of 4 mm than outside the region of the thickening (9).

When the carrier part (12) is made of a black thermoplastic material, the cross-section of the inner skin (II) that is not directly back-injected with black material is also reduced in this embodiment compared with the prior art add-on part (21) depicted in FIG. 1. The area of the inner skin (II) that is not back-injected corresponds in this embodiment to the area of the camera lens (7). In this way, the optical properties of the add-on part (11) can be improved; the camera module (3) is also less visible from the outside.

The cover (1) and the carrier part (12) bonded thereon of the add-on part (11) depicted in FIG. 2 are, for example, produced as a 2-component injection molded part.

Figure 3:
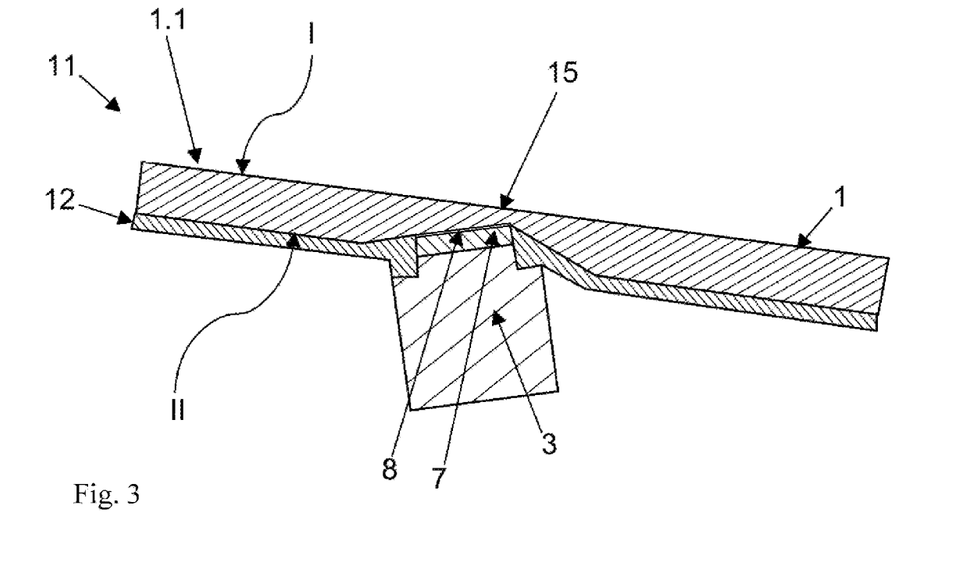
Figure 15:
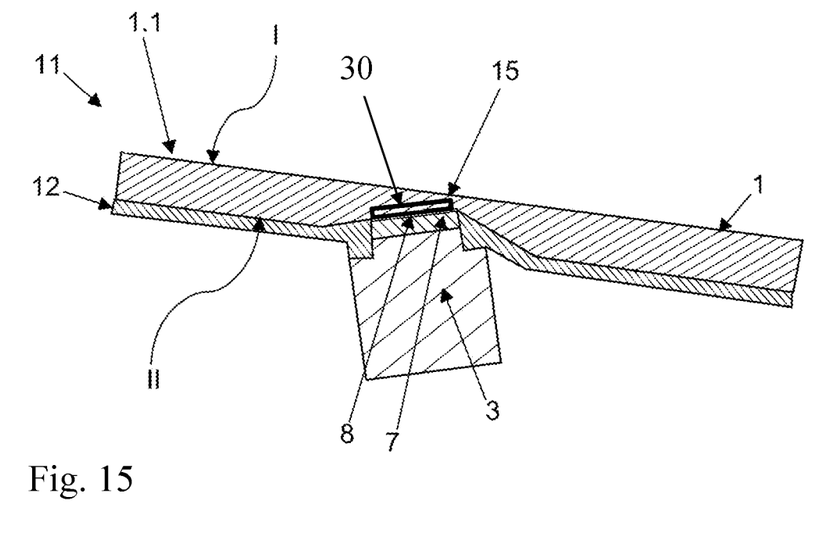

FIG. 3 depicts a cross-section of another embodiment of the add-on part (11) according to the invention, comprising a cover (1) made of a transparent thermoplastic material (1.1), a carrier part (12) connected thereto made of a thermoplastic material, and a camera module (3) held in the carrier part (12) and having a lens (7) that is arranged in the direction of the inner side (II) of the cover (1). The diameter of the camera lens (7) is, for example, 11 mm. In the embodiment depicted, the angle between the viewing direction of the camera lens (7) and the outer side (I) of the cover (1) is different from 90°. The cover (1) has, on its inner side (II), a local thinning (15) of the transparent thermoplastic material (1.1). The camera lens (7) is arranged directly opposite the region of the thinning (15). As a result, the cover (1) is connected to the camera lens (7) substantially flush, and the cavity with air (8) formed between the camera lens (7) and the inner side (II) of the cover (1) is minimized. In this way, the fogging of the lens (7) or the inner side (II) of the cover (1) due to condensation of water vapor can be minimized. The thermoplastic material (1.1) is, in the region outside the thinning (15), for example, 5 mm thick and, in the region of the thinning (15), is thinner by a maximum of 3 mm than outside the region of the thinning (15). In an embodiment, as shown in FIG. 15, a structure 30, which can include prisms or Fresnel optics, is arranged in the transparent thermoplastic material of the cover on the inner side in the direction of the camera lens.

When the carrier part (12) is made of a black thermoplastic material, the cross-section of the inner skin (II) that is not directly back-injected with black material is also reduced in this embodiment compared with the prior art add-on part (21) depicted in FIG. 1. The area of the inner skin (II) that is not back-injected corresponds in this embodiment to the area of the camera lens (7). In this way, the optical properties of the add-on part (11) can be improved; the camera module (3) is also less visible from the outside.

The cover (1) and the carrier part (12) bonded thereon of the add-on part (11) depicted in FIG. 3 are, for example, produced as a 2-component injection molded part.

Figure 4:
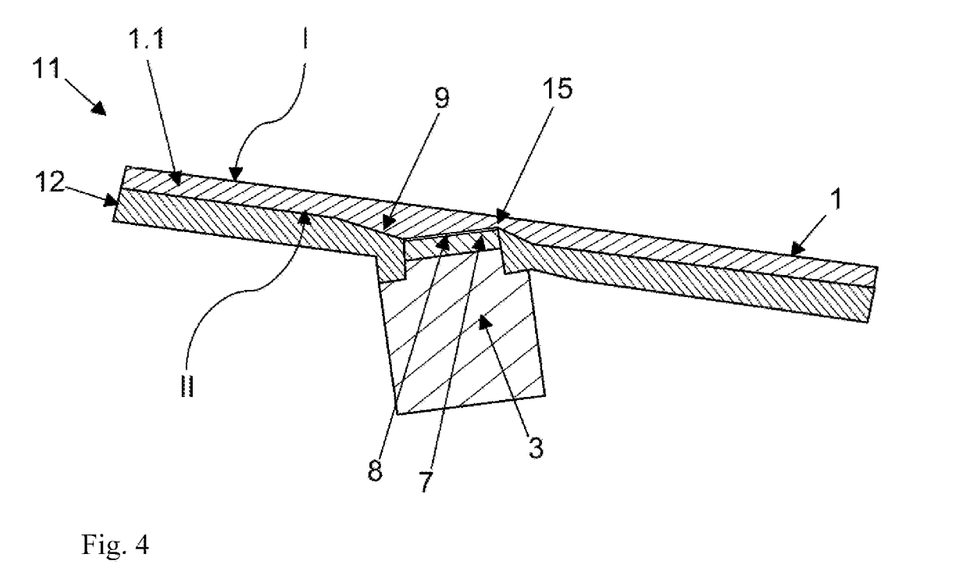

FIG. 4 depicts a cross-section of another embodiment of the add-on part (11) according to the invention, comprising a cover (1) made of a transparent thermoplastic material (1.1), a carrier part (12) connected thereto made of a thermoplastic material, and a camera module (3) held in the carrier part (12) and having a lens (7) that is arranged in the direction of the inner side (II) of the cover (1). The diameter of the camera lens (7) is, for example, 11 mm. In the embodiment depicted, the angle between the viewing direction of the camera lens (7) and the outer side (I) of the cover (1) is different from 90°. The cover (1) has, on its inner side (II), a local thickening (9) and a local thinning (15) of the transparent thermoplastic material (1.1). The camera lens (7) is arranged directly opposite the region of the thickening (9) and thinning (15). As a result, the cover (1) is connected to the camera lens (7) substantially flush and the cavity with air (8) formed between the camera lens (7) and the inner side (II) of the cover (1) is minimized. In this way, the fogging of the lens (7) or the inner side (II) of the cover (1) due to condensation of water vapor can be minimized. The thermoplastic material (1.1) is, in the region outside the thickening (9) and outside the thinning (15), for example, 5 mm thick and in the region of the thickening (9), is thicker by a maximum of 3 mm and in the region of the thinning (15), is thinner by a maximum of 3 mm than outside the region of the thickening (9) and the thinning (15).

When the carrier part (12) is made of a black thermoplastic material, the cross-section of the inner skin (II), which is not directly back-injected with black material, is also reduced in this embodiment compared with the prior art add-on part (21) depicted in FIG. 1. The area of the inner skin (II) that is not back-injected corresponds in this embodiment to the area of the camera lens (7). In this way, the optical properties of the add-on part (11) can be improved; the camera module (3) is also less visible from the outside.

The cover (1) and the carrier part (12) bonded thereon of the add-on part (11) depicted in FIG. 4 are, for example, produced as a 2-component injection molded part.

Figure 5:
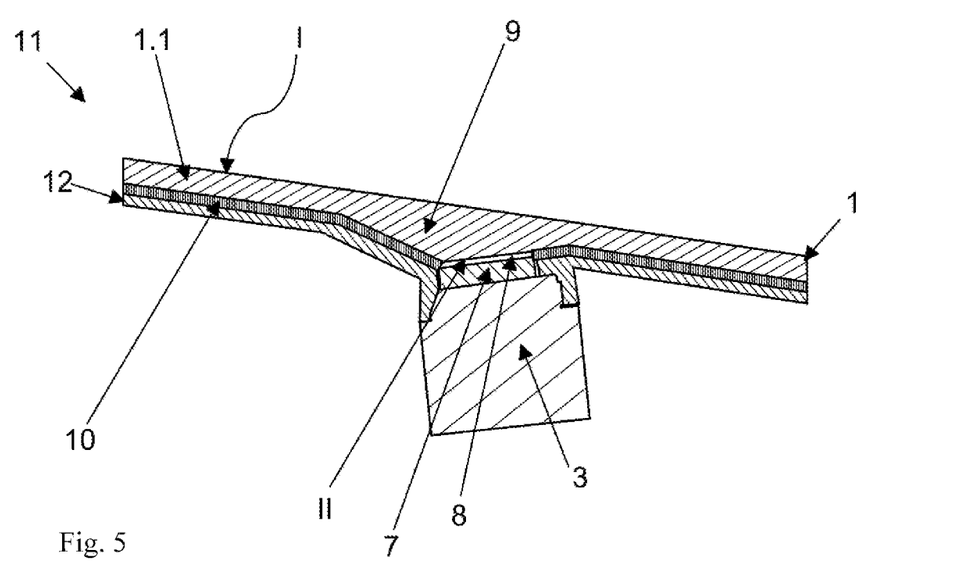

FIG. 5 depicts a cross-section of an alternative embodiment of an add-on part (11) according to the invention, comprising a cover (1) made of a film (10) back-injected with a transparent thermoplastic material (1.1), a carrier part (12) connected to the film (10) and made of a thermoplastic material, and a camera module (3) held in the carrier part (12) and having a lens (7) that is arranged in the direction of the inner side (II) of the transparent thermoplastic material (1.1). The diameter of the camera lens (7) is, for example, 11 mm. In the embodiment depicted, the angle between the viewing direction of the camera lens (7) and the outer side (I) of the cover (1) is different from 90°. The back-injected film (10) has a recess in the region in which the lens (7) is arranged in the add-on part (11). The transparent thermoplastic material (1.1) of the cover (1) has, on its inner side (II) in the direction of the camera lens (7), a local thickening (9) and thus reaches all the way to the camera lens (7). The camera lens (7) is arranged directly opposite the local thickening (9). As a result, the cover (1) is connected to the camera lens (7) substantially flush; and the cavity with air (8) formed between the camera lens (7) and the inner side (II) of the transparent thermoplastic material (1.1) of the cover (1) is minimized. In this way, the fogging of the lens (7) or the inner side (II) of the transparent thermoplastic material (1.1) of the cover (1) due to condensation of water vapor can be minimized. The thermoplastic material (1.1) is, in the region outside the thickening (9), for example, 3 mm thick and, in the region of the thickening (9), is thicker by a maximum of 4 mm than outside the region of the thickening (9).

In this embodiment, with the use of a black film as a back-injected film (10), the cross-section of that inner side (II) of the cover (1) that is not directly connected to a black material is reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

This embodiment offers, with the use of a film that is colored and/or provided with one or more patterns, the possibility of introducing decorative elements into the add-on part via the film.

Figure 6:
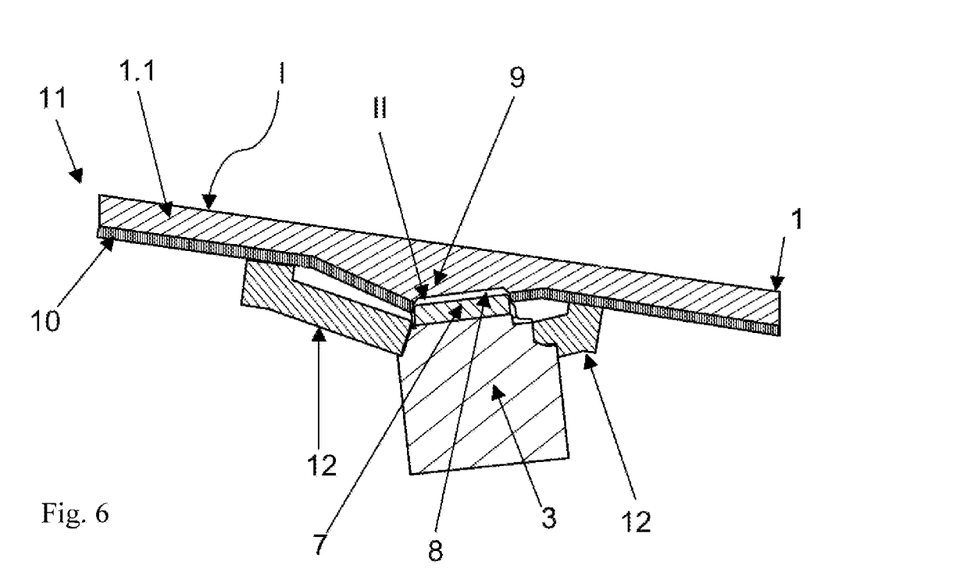

FIG. 6 depicts a cross-section of an alternative embodiment of an add-on part (11) according to the invention, comprising a cover (1) made of a film (10) back-injected with a transparent thermoplastic material (1.1), a carrier part (12) connected to the film (10), and a camera module (3) held in the carrier part (12) and having a lens (7) that is arranged in the direction of the inner side (II) of the transparent thermoplastic material (1.1) of the cover (1). The diameter of the camera lens (7) is, for example, 11 mm. In the embodiment depicted, the angle between the viewing direction of the camera lens (7) and the outer side (I) of the cover (1) is different from 90°. The back-injected film (10) has a recess in the region in which the lens (7) is arranged in the add-on part (11). The transparent thermoplastic material (1.1) of the cover (1) has on its inner side (II) in the direction of the camera lens (7) a local thickening (9) and thus reaches all the way to the camera lens (7). As a result, the cover (1) is connected to the camera lens (7) substantially flush and the cavity with air (8) formed between the camera lens (7) and the inner side (II) of the transparent thermoplastic material (1.1) of the cover (1) is minimized. In this way, the fogging of the lens (7) or the inner side (II) of the transparent thermoplastic material (1.1) of the cover (1) due to condensation of water vapor can be minimized. The thermoplastic material (1.1) is, in the region outside the thickening (9), for example, 3 mm thick and in the region of the thickening (9) is thicker by a maximum of 4 mm than outside the region of the thickening (9).

In this embodiment, with the use of a black film as a back-injected film (10), the cross-section of that inner side (II) of the cover (1) that is not directly connected to a black material is reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

The embodiment depicted in FIG. 6 differs from that depicted in FIG. 5 only with regard to the shape of the carrier part (12).

Figure 7:
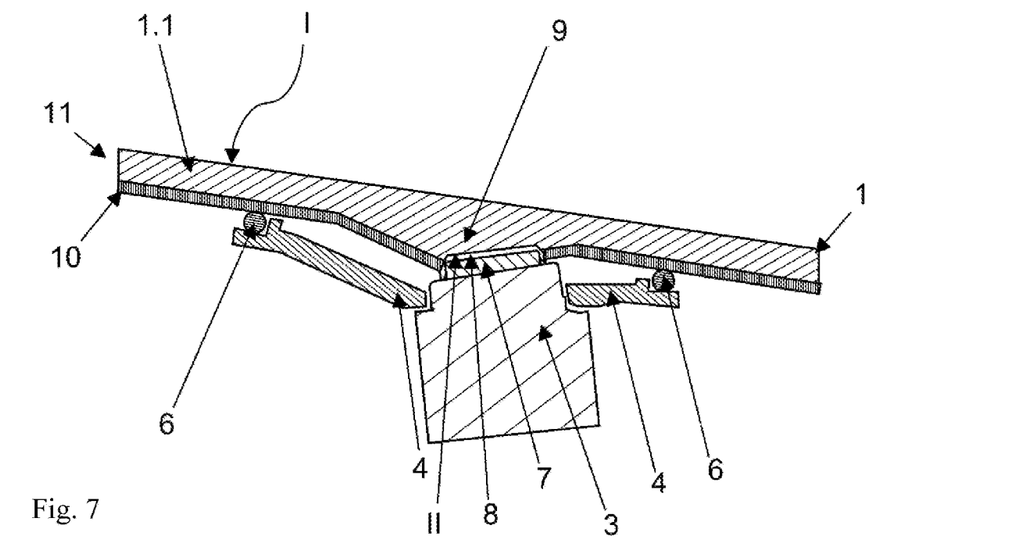

FIG. 7 depicts a cross-section of a preferred embodiment of the add-on part according to the invention depicted in FIG. 6, in which the carrier part corresponds to the camera carrier (4) with a ring seal (6) used in the prior art (cf. FIG. 1).

The transparent thermoplastic material (1.1) of the cover (1) has, on its inner side (II) in the direction of the camera lens (7), a local thickening (9) and thus reaches all the way to the camera lens (7). As a result, the cover (1) is connected to the camera lens (7) approx. flush and the cavity with air (8) formed between the camera lens (7) and the inner side (II) of the transparent thermoplastic material (1.1) of the cover (1) is minimized. In this way, the fogging of the lens (7) or the inner side (II) of the transparent thermoplastic material (1.1) of the cover (1) due to condensation of water vapor can be minimized. The thermoplastic material (1.1) is, in the region outside the thickening (9), for example, 3 mm thick and, in the region of the thickening (9), is thicker by a maximum of 4 mm than outside the region of the thickening (9).

In this embodiment, with the use of a black film as a back-injected film (10), the cross-section of that inner side (II) of the cover (1) that is not directly connected to a black material is also reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

Figure 8:
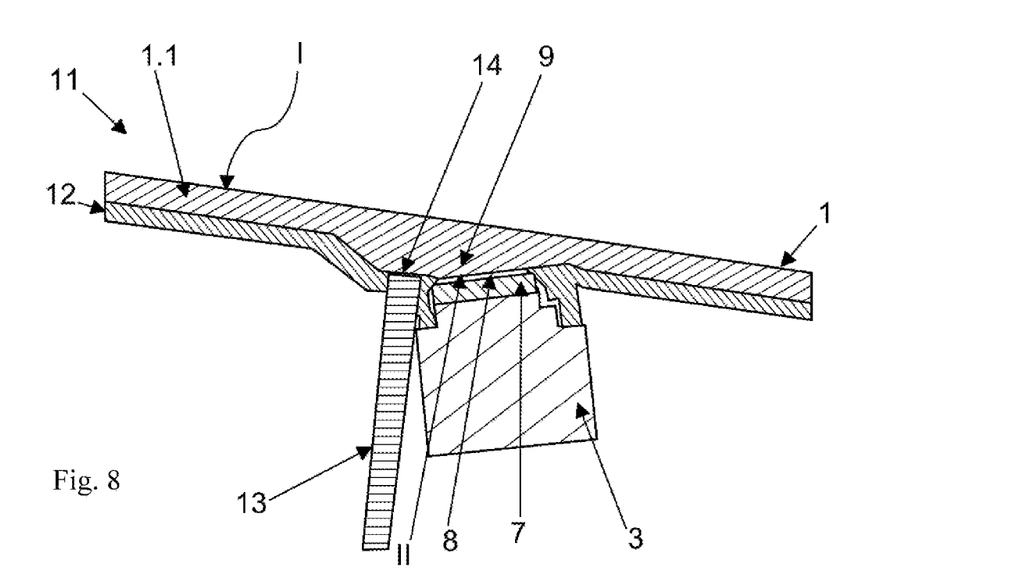

FIG. 8 depicts a cross-section of an embodiment of the add-on part according to the invention, wherein the nozzle (13) for injecting the cover (1) is depicted and the embodiment otherwise substantially corresponds to the embodiment depicted in FIG. 2. As can be seen in FIG. 8, the injection point (14) is preferably in the region that later forms the local thickening (9) of the cover (1). With such a positioning of the nozzle (13), appropriate holding pressure can be applied in this region after the de-molding of the injection molding compound; and, thus, a collapse can be avoided or minimized during cooling of the transparent injection molding compound in the injection mold. In this way, a deterioration of the reflection optics on the outside of the panel due to sink marks can be avoided. The injection point (14) is preferably arranged near the region in which the camera lens (7) is positioned. By positioning the injection point (14) outside the region of the cover through which the beam path of the camera lens (7) runs after installation of the camera module (3), the optics of the camera module (3) are not affected by the injection point (14).

Figure 9:
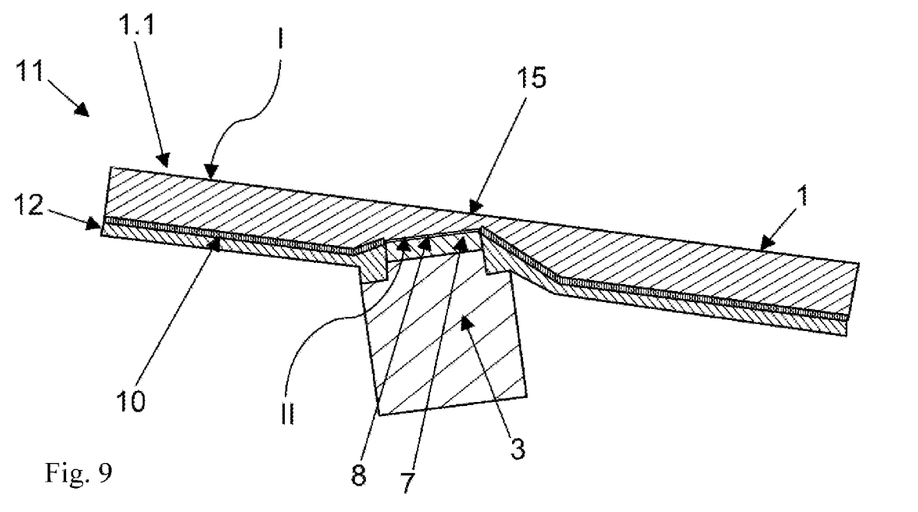

FIG. 9 depicts a cross-section of another embodiment of an add-on part (11) according to the invention, comprising a cover (1) made of a film (10) back-injected with a transparent thermoplastic material (1.1), a carrier part (12) made of a thermoplastic material connected to the film (10), and a camera module (3) held in the carrier part (12) and having a lens (7) that is arranged in the direction of the inner side (II) of the transparent thermoplastic material (1.1). The diameter of the camera lens (7), is for example, 11 mm. In the embodiment depicted, the angle between the viewing direction of the camera lens (7) and the outer side (I) of the cover (1) is different from 90°. The back-injected film (10) has a recess in the region in which the lens (7) is arranged in the add-on part (11). The transparent thermoplastic material (1.1) of the cover (1) has, on its inner side (II), a local thinning (15). The camera lens (7) is arranged directly opposite the local thinning (15). As a result, the cover (1) is connected to the camera lens (7) substantially flush; and the cavity with air (8) formed between the camera lens (7) and the inner side (II) of the transparent thermoplastic material (1.1) of the cover (1) is minimized. In this way, the fogging of the lens (7) or the inner side (II) of the transparent thermoplastic material (1.1) of the cover (1) due to condensation of water vapor can be minimized. The thermoplastic material (1.1) is, in the region outside the thinning (15) for example, 5 mm thick and in the region of the thinning (15) is thinner by a maximum of 3 mm than outside the region of the thinning (15).

In this embodiment, with the use of a black film as a back-injected film (10), the cross-section of that inner side (II) of the cover (1) that is not directly connected to a black material is reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

This embodiment offers, with the use of a film that is colored and/or provided with one or more patterns, the possibility of introducing decorative elements into the add-on part via the film.

Figure 10:
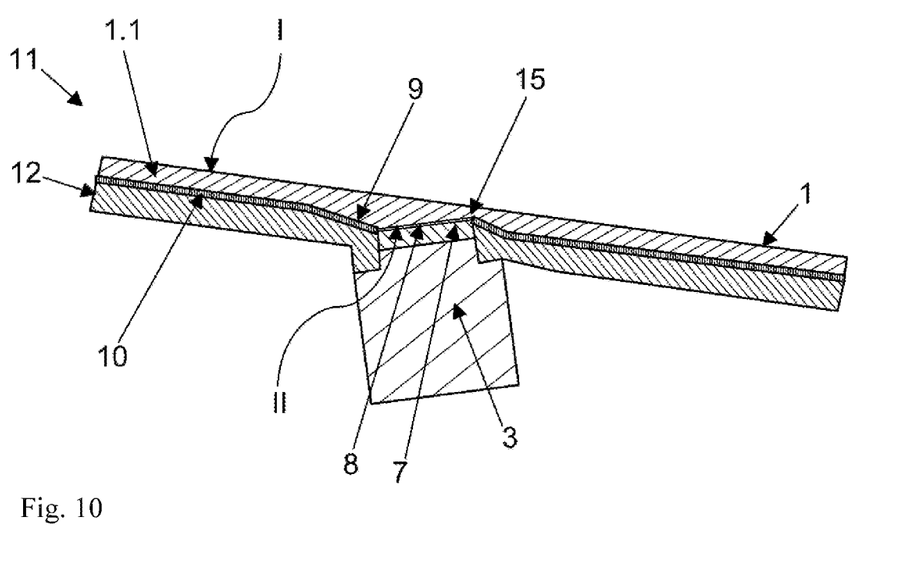

FIG. 10 depicts a cross-section of another embodiment of an add-on part (11) according to the invention, comprising a cover (1) made of a film (10) back-injected with a transparent thermoplastic material (1.1), a carrier part (12) made of a thermoplastic material and connected to the film (10), and a camera module (3) held in the carrier part (12) and having a lens (7) that is arranged in the direction of the inner side (II) of the transparent thermoplastic material (1.1). The diameter of the camera lens (7) is, for example, 11 mm. In the embodiment depicted, the angle between the viewing direction of the camera lens (7) and the outer side (I) of the cover (1) is different from 90°. The back-injected film (10) has a recess in the region in which the lens (7) is arranged in the add-on part (11). The transparent thermoplastic material (1.1) of the cover (1) has, on its inner side (II), a local thickening (9) and a local thinning (15) of the transparent thermoplastic material (1.1). The camera lens (7) is arranged directly opposite the region of the thickening (9) and thinning (15). As a result, the cover (1) is connected to the camera lens (7) substantially flush; and the cavity with air (8) formed between the camera lens (7) and the inner side (II) of the cover (1) is minimized. In this way, the fogging of the lens (7) or the inner side (II) of the cover (1) due to condensation of water vapor can be minimized. The thermoplastic material (1.1) is, in the region outside the thickening (9) and outside the thinning (15), for example, 5 mm thick and in the region of the thickening (9) is thicker by a maximum of 3 mm, and in the region of the thinning (15) is thinner by a maximum of 3 mm than outside the region of the thickening (9) and the thinning (15).

In this embodiment, with the use of a black film as a back-injected film (10), the cross-section of that inner side (II) of the cover (1) that is not directly connected to a black material is reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

This embodiment as well offers, with the use of a film that is colored and/or provided with one or more patterns, the possibility of introducing decorative elements into the add-on part via the film.

Figure 11:
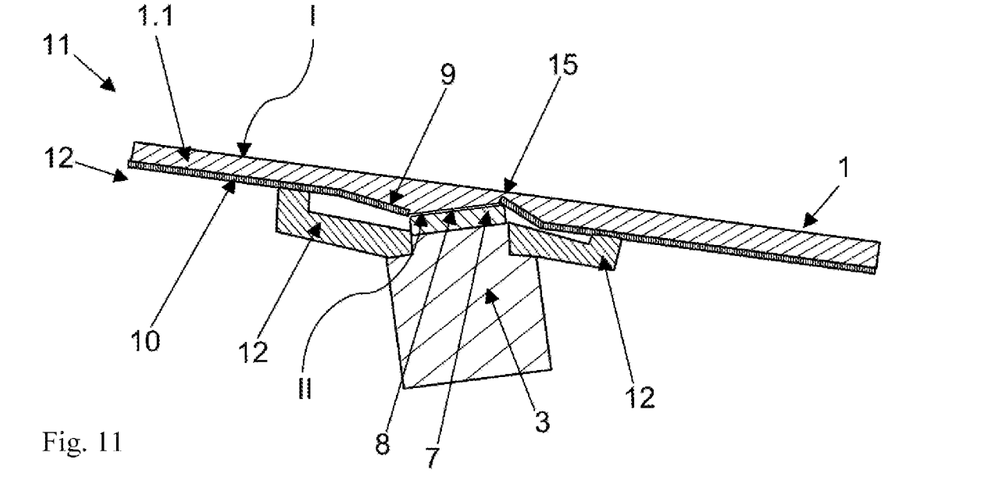

FIG. 11 depicts a cross-section of an alternative embodiment of an add-on part (11) according to the invention, comprising a cover (1) made of a film (10) back-injected with a transparent thermoplastic material (1.1), a carrier part (12) connected to the film (10), and a camera module (3) held in the carrier part (12) and having a lens (7) that is arranged in the direction of the inner side (II) of the transparent thermoplastic material (1.1) of the cover (1). The diameter of the camera lens (7) is, for example, 11 mm. In the embodiment depicted, the angle between the viewing direction of the camera lens (7) and the outer side (I) of the cover (1) is different from 90°. The back-injected film (10) has a recess in the region in which the lens (7) is arranged in the add-on part (11). The transparent thermoplastic material (1.1) of the cover (1) has, on its inner side (II), a local thickening (9) and a local thinning (15) of the transparent thermoplastic material (1.1). The camera lens (7) is arranged directly opposite the region of the thickening (9) and thinning (15). As a result, the cover (1) is connected to the camera lens (7) substantially flush; and the cavity with air (8) formed between the camera lens (7) and the inner side (II) of the cover (1) is minimized. In this way, the fogging of the lens (7) or the inner side (II) of the cover (1) due to condensation of water vapor can be minimized. The thermoplastic material (1.1) is, in the region outside the thickening (9) and outside the thinning (15), for example, 5 mm thick and in the region of the thickening (9) is thicker by a maximum of 3 mm and in the region of the thinning (15) is thinner by a maximum of 3 mm than outside the region of the thickening (9) and the thinning (15).

In this embodiment, with the use of a black film as a back-injected film (10), the cross-section of that inner side (II) of the cover (1) that is not directly connected to a black material is reduced compared to the prior art add-on part (21) depicted in FIG. 1. The area of the inner side (II) of the cover (1) that is not connected to a black material corresponds in this embodiment to the area of the camera lens (7). In this way, the optical properties of the add-on part (11) can be improved; the camera module (3) is also less visible from the outside.

This embodiment as well offers, with the use of a film that is colored and/or provided with one or more patterns, the possibility of introducing decorative elements into the add-on part via the film.

Figure 12:
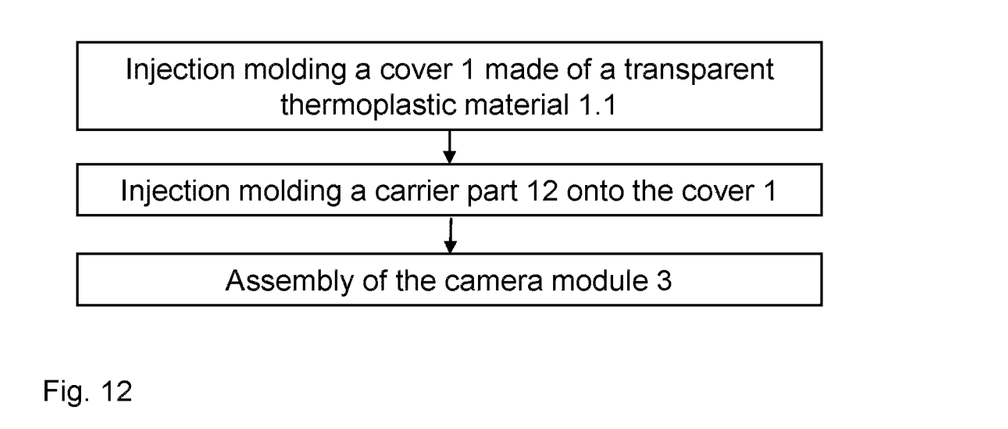

FIG. 12 depicts a flow chart of a method according to the invention for producing an add-on part (11) according to the invention. In this method, the cover (1) and the carrier part (12) are manufactured as a 2-component injection molded part. In a first step, the cover (1) made of a transparent thermoplastic material (1.1) is injection molded. In a second step, the carrier part (12) made of a thermoplastic, preferably black plastic is molded onto the cover (1). The cover (1) has, on the inner side (II), a local thickening (9) and/or a local thinning (15).

In a further step, the camera module (3) is assembled, wherein the camera module is arranged such that the camera lens (7) is directly opposite the local thickening (9) and/or the local thinning (15) of the transparent thermoplastic material (1.1) of the cover (1).

Optionally, the method can include coating, preferably flood coating, with a protective coating as a step.

Figure 13:
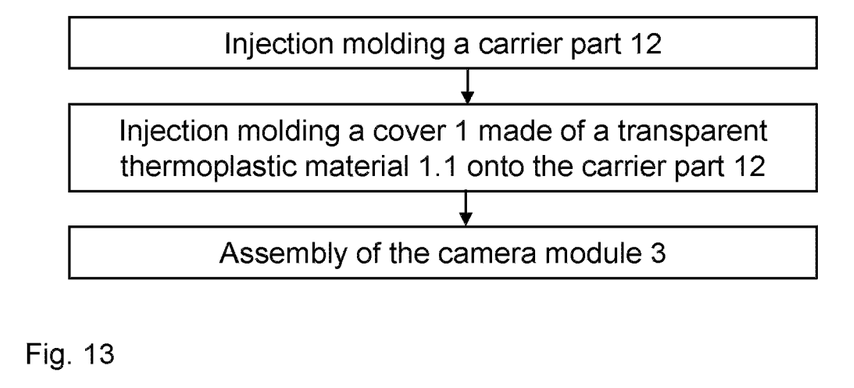

FIG. 13 depicts a flow chart of an alternative method according to the invention for producing an add-on part (11) according to the invention. In this method, the cover (1) and the carrier part (12) are manufactured as a 2-component injection molded part. In a first step, the carrier part (12) made of a thermoplastic, preferably black plastic, is injection molded. In a second step, the cover (1) made of a transparent thermoplastic material (1.1) is molded onto the carrier part (12). The cover (1) has, on the inner side (II), a local thickening (9) and/or thinning (15).

In a further step, the camera module (3) is assembled, wherein the camera module is arranged such that the camera lens (7) is directly opposite the local thickening (9) and/or the local thinning (15) of the transparent thermoplastic material (1.1) of the cover (1).

Optionally, the method can include coating, preferably flood coating, with a protective coating as a step.

Figure 14:
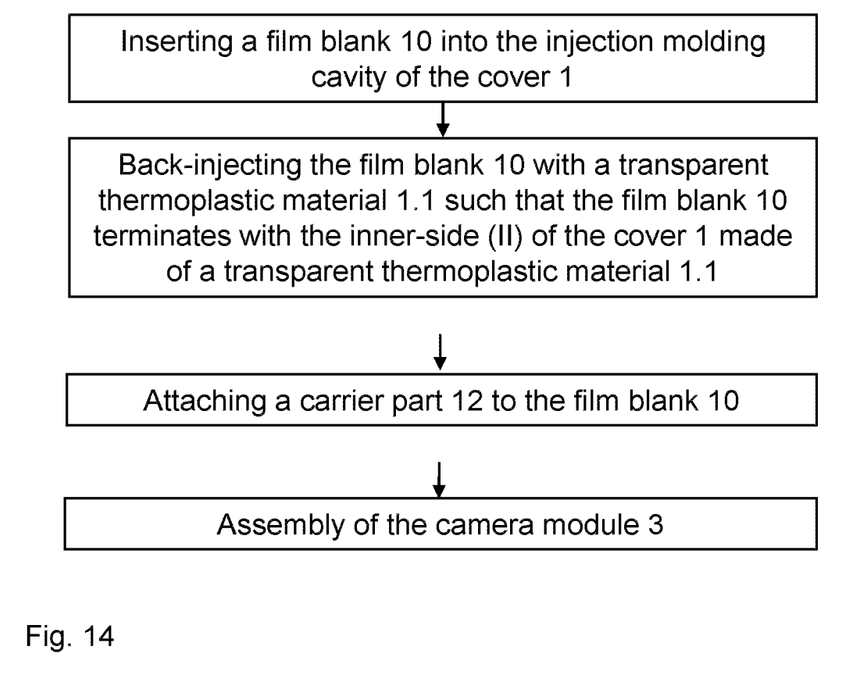

FIG. 14 depicts a flow chart of an alternative method according to the invention for producing an add-on part (11) according to the invention. In this method, the cover (1) is manufactured as an injection molded part consisting of a film (10) back-injected with a transparent thermoplastic material (1.1). In a first step, a preferably black film blank is placed in the injection molding cavity of a cover (1). In a second step, the film blank (10) is back-injected with a transparent thermoplastic material (1.1) such that the film blank (10) terminates with the inner side (II) of the transparent thermoplastic material (1.1) of the cover (1). The cover (1) has, on the inner side (II), a local thickening (9) and/or thinning (15).

In a third step, a carrier part (12) is attached to the film blank (10). The carrier part (12) can, for example, be manufactured as an injection molded part made of a thermoplastic material. However, any other holding device for a camera module (3) is suitable as a carrier part (12), thus, the carrier part (12) can, for example, also be formed analogous to the add-on part (11) known in the prior art as a camera carrier (4) with a ring seal (6).

In a further step, the camera module (3) is assembled, wherein the camera module is arranged such that the camera lens (7) is directly opposite the local thickening (9) and/or the local thinning (15) of the transparent thermoplastic material (1.1) of the cover (1).

Optionally, the method can include coating, preferably flood coating, with a protective coating, as a step. If the carrier part (12) is not implemented as an injection molded part, no fastening elements or cable ducts can be integrated therein, such that this method is not preferred in this respect. An add-on part (11) produced in accordance with the method depicted in FIG. 14 having, for example, a carrier part formed analogous to the prior art can, however, be suitable in particular for production of small series since the tool costs are in this case lower than with an add-on part (11) implemented as a 2-component injection molded part.

LIST OF REFERENCE CHARACTERS 1 cover, cover according to the invention
1.1 transparent thermoplastic material
2 inner shell
3 camera module
4 camera carrier
5 flocking
6 ring seal
7 camera lens
8 cavity with air
9 thickening
10 film/film blank
11 add-on part/vehicle add-on part, add-on part/vehicle add-on part according to the invention
12 carrier part
13 nozzle
14 injection point
15 thinning
I outer side/outer skin
II inner side/inner skin
20 cover, prior art cover
21 add-on part, prior art add-on part

The invention claimed is:

1. A vehicle add-on part having an integrated camera module, comprising:
a cover with an outer side and an inner side, wherein the cover consists, at least in sections, of a transparent thermoplastic material;
a carrier part that is arranged on the inner side of the cover and in which a camera module is arranged;
wherein the cover has, on the inner side, a local thickening and/or a local thinning of the transparent thermoplastic material;
and wherein the camera module includes at least one camera lens and is arranged in the carrier part such that the at least one camera lens is arranged directly opposite the local thickening and/or the local thinning, said carrier part being made of a material that is absent between the at least one camera lens and a region of the local thickening and/or the local thinning that is directly opposite the at least one camera lens such that said region of the local thickening and/or the local thinning terminates in a materially integral manner or substantially flush with the at least one camera lens.

2. The vehicle add-on part according to claim 1, wherein the outer side of the cover has substantially the form of a planar surface or a curved surface.

3. The vehicle add-on part according to claim 1, wherein the vehicle add-on part is a front window, a rear window, a side window, a roof panel, a trim strip, a bumper, a sill, a spoiler, a lamp cover, or a panel.

4. The vehicle add-on part according to claim 1, wherein structures are introduced into the transparent thermoplastic material of the cover on the inner side in the direction of the camera lens.

5. The vehicle add-on part according to claim 1, wherein the material of the carrier part for the camera module is made of a thermoplastic material.

6. The vehicle add-on part according to claim 5, wherein a recess for holding the camera module is introduced into the thermoplastic material of the carrier part.

7. The vehicle add-on part according to claim 5, wherein the cover is entirely made of transparent thermoplastic material.

8. The vehicle add-on part according to claim 1, wherein the vehicle add-on part includes a polymeric film.

9. The vehicle add-on part according to claim 1, wherein the cover is coated, at least on the outer side, with a protective coating.

10. A method for producing a vehicle add-on part having an integrated camera module that includes at least one camera lens, the method comprising:
    in a first step, producing, by means of an injection molding process, a cover that consists, at least in sections, of a transparent thermoplastic material and that has, on its inner side, a local thickening and/or a local thinning of the transparent thermoplastic material, and
    in a second step, injection molding a carrier part made of thermoplastic material for the camera module that includes at least one camera lens onto the cover, on the inner side;
    or
    in a first step, producing, by means of an injection molding process, a carrier part made of a thermoplastic material for the camera module that includes at least one camera lens, and
    in a second step, molding a cover that is made, at least in sections, of a transparent thermoplastic material and has, on its inner side, a local thickening and/or a local thinning of the transparent thermoplastic material, onto the carrier part such that the inner side of the cover is connected to the carrier part;
    in a third step, holding the camera module in the carrier part such that the at least one camera lens is arranged directly opposite the local thickening and/or the local thinning,
    wherein the thermoplastic material of said carrier part is absent between the at least one camera lens and a region of the local thickening and/or the local thinning that is directly opposite the at least one camera lens such that said region of the local thickening and/or the local thinning terminates in a materially integral manner or substantially flush with the at least one camera lens.

11. The method according to claim 10, wherein the cover and the carrier part connected thereon are produced in the 2-component injection molding process or in the 2-component injection-compression molding process with turning platen technology.

12. A method for producing a vehicle add-on part having an integrated camera module that includes at least one camera lens, the method comprising:
    in a first step, producing as a 1-component injection molded part with a back-injected polymeric film a cover that is made, at least in sections, of a transparent thermoplastic material and that has, on its inner side, a local thickening and/or a local thinning of the transparent thermoplastic material, wherein the film is arranged on the inner side of the cover;
    in a second step, providing a carrier part for the camera module;
    in a third step, attaching the carrier part on the back-injected polymeric film, and
    in a fourth step, holding the camera module that includes at least one camera lens in the carrier part such that the camera lens is arranged directly opposite the local thickening and/or the local thinning,
    wherein said carrier part is made of a material that is absent between the at least one camera lens and a region of the local thickening and/or the local thinning that is directly opposite the at least one camera lens such that said region of the local thickening and/or the local thinning terminates in a materially integral manner or substantially flush with the at least one camera lens.

13. The method according to claim 10, wherein an injection molding compound is introduced, during production of the cover, via a lateral fan sprue and/or lateral injection points and/or via an injection point in the region of the local thickening and/or the local thinning.

14. The method according to claim 10, wherein a protective coating is applied at least on an outer side of the vehicle add-on part or of the cover and/or of the carrier part.

15. A method comprising utilizing a vehicle add-on part according to claim 1 for integrating a camera module in a vehicle.

16. The vehicle add-on part according to claim 4, wherein the structures include curvatures, prisms, or Fresnel optics.

17. The vehicle add-on part according to claim 5, wherein the thermoplastic material of the carrier part is an opaque thermoplastic material.

18. The vehicle add-on part according to claim 7, wherein the cover and the carrier part are implemented as a 2-component injection molded part.

19. The vehicle add-on part according to claim 8, wherein the polymeric film is a back-injected polymeric film, which is arranged between the cover and the carrier part.

* * * * *